(12) United States Patent
Niger et al.

(10) Patent No.: US 8,724,451 B2
(45) Date of Patent: May 13, 2014

(54) METHOD FOR PROTECTING A PSEUDO-WIRE

(75) Inventors: Philippe Niger, Lannion (FR); Frédéric Jounay, Plemeur Bodou (FR)

(73) Assignee: France Telecom, Paris (FR)

( * ) Notice: Subject to any disclaimer, the term of this patent is extended or adjusted under 35 U.S.C. 154(b) by 92 days.

(21) Appl. No.: 13/001,508

(22) PCT Filed: Jun. 26, 2009

(86) PCT No.: PCT/FR2009/051238
§ 371 (c)(1),
(2), (4) Date: Mar. 8, 2011

(87) PCT Pub. No.: WO2009/156704
PCT Pub. Date: Dec. 30, 2009

(65) Prior Publication Data
US 2011/0176411 A1 Jul. 21, 2011

(30) Foreign Application Priority Data
Jun. 27, 2008 (FR) ...................... 08 54338

(51) Int. Cl.
*H04J 1/16* (2006.01)
(52) U.S. Cl.
USPC .......... 370/218; 370/225; 370/228; 370/389; 370/401
(58) Field of Classification Search
None
See application file for complete search history.

(56) References Cited

U.S. PATENT DOCUMENTS

| 7,701,951 | B2 * | 4/2010 | Chapman et al. | ........ 370/395.52 |
| 7,940,652 | B1 * | 5/2011 | Pan | .............................. 370/228 |
| 8,081,563 | B2 * | 12/2011 | Guichard et al. | ............. 370/221 |
| 8,130,775 | B2 * | 3/2012 | Jounay et al. | ................. 370/401 |
| 8,374,078 | B2 * | 2/2013 | Ballantyne et al. | ........... 370/218 |
| 2008/0062996 | A1 * | 3/2008 | Kaippallimalil et al. | .. 370/395.1 |
| 2009/0154453 | A1 * | 6/2009 | Shah et al. | .................... 370/389 |
| 2009/0290591 | A1 * | 11/2009 | Zhang et al. | ................. 370/401 |
| 2012/0147737 | A1 * | 6/2012 | Taylor et al. | ................... 370/219 |

OTHER PUBLICATIONS

English Translation of the Written Opinion dated Mar. 1, 2011 for corresponding International Application No. PCT/FR2009/051238, filed Jun. 26, 2009.
International Search Report and Written Opinion dated Jun. 16, 2010 for corresponding International Application No. PCT/FR2009/051238, filed Jun. 26, 2009.

(Continued)

*Primary Examiner* — Willie J Daniel, Jr.
(74) *Attorney, Agent, or Firm* — David D. Brush; Westman, Champlin & Koehler P.A.

(57) ABSTRACT

A method and apparatus are provided for establishing a first pseudo-wire between a first item of input terminal equipment and an item of output terminal equipment, used by the first item of input terminal equipment. The method includes a step of transmitting a first message requesting establishment of the first pseudo-wire to an item of switching equipment, the first pseudo-wire to be established consisting of a first link between the first item of input terminal equipment and the item of switching equipment and of a second link between the item of switching equipment and the item of output terminal equipment. In such a method, the first establishment-request message also includes a request to establish at least one backup pseudo-wire consisting of the second link and of a third link to be established between the item of switching equipment and a second item of input terminal equipment.

5 Claims, 3 Drawing Sheets

(56) References Cited

OTHER PUBLICATIONS

Pan et al., "Pseudo Wire Protection: draft-pan-pwe3-protection-03.txt" IETF Standard Working Draft, Internet Engineering Task Force, IETF, CH, No. 3, Jul. 1, 2006, XP015047198.

Luca Martini et al., "Segmented Pseudo Wire: draft-ietf-pwe3-segmented-pw-06.txt" IETF Standard Working Draft, Internet Engineering Task Force, IETF, CH, vol. pwe3, No. 6, Nov. 1, 2007, XP015053784.

* cited by examiner

METHOD FOR PROTECTING A PSEUDO-WIRE

CROSS-REFERENCE TO RELATED APPLICATIONS

This Application is a Section 371 National Stage Application of International Application No. PCT/FR2009/051238, filed Jun. 26, 2009 and published as WO 2009/156704 on Dec. 30, 2009, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure is situated in the field of telecommunications, and more particularly, but not exclusively, the field of packet-switched networks.

BACKGROUND OF THE DISCLOSURE

In a packet-switched network, the data to be transmitted take the form of packets processed by items of network equipment until they reach their destination. All of the packets to be transmitted constitute a datastream.

An example of technology used in packet-switched networks to convey data packets is the MPLS (MultiProtocol Label Switching) technology. The MPLS technology proposes adding, in the header of the data packets, one or more labels containing information allowing an item of network equipment to determine the next item of equipment through which a packet is to travel in order to reach its destination. The MPLS technology is described in greater detail in a document of the IETF (an Internet standardization group called the Internet Engineering Task Force), referenced RFC 3031 (RFC meaning "Request For Comments").

However, the MPLS protocol makes it possible to process only packets that comply with the IP (Internet Protocol) protocol.

In order to alleviate this drawback, the PWE3 (Pseudo Wire Emulation Edge to Edge) standardization group of the IETF defines a pseudo-wire concept making it possible to emulate a point-to-point link between two items of equipment of a packet-switched network based on the IP/MPLS technology. Such pseudo-wires, defined in document RFC 3985 under the term "pseudo-wire", allow the transmission of data packets that do not comply with the IP protocol, such as for example data packets complying with the ATM protocol.

With reference to FIG. 1, a pseudo-wire pw1 is established between a first item of terminal equipment T-PE1 placed on the edge of a packet-switched network PSN and a second item of terminal equipment T-PE2 also placed on the edge of the PSN network. A first link L1 constituting the pseudo-wire pw1 is established between the first item of terminal equipment and an item of switching equipment S-PE of the PSN network. A second link L2, also constituting the pseudo-wire pw1, is, for its part, established between the item of switching equipment S-PE and the second item of terminal equipment T-PE2. The first item of terminal equipment T-PE1 is called an item of input terminal equipment and constitutes a first end of the pseudo-wire pw1 and the second item of terminal equipment T-PE2 is called an item of output terminal equipment and constitutes a second end of the pseudo-wire pw1. Once the pseudo-wire pw1 is established, the item of input terminal equipment T-PE1 transmits a datastream routed via the pseudo-wire pw1 to the item of output terminal equipment T-PE2. Such a pseudo-wire pw1 is defined in greater detail in document "An Architecture for Multi-Segment Pseudo-Wire Emulation Edge-to-Edge. draft-ietf-pwe3-ms-pw-arch-03.txt". Such a pseudo-wire allows a two-way transmission of the datastream. Therefore, in a first transmission direction, the first item of terminal equipment is an item of input terminal equipment, and in a second transmission direction, the first item of terminal equipment is seen as an item of output terminal equipment.

In order to ensure the continuity of service in the event of failure of the item of input terminal equipment, the PWE3 task force proposes a solution consisting in duplicating the first pseudo-wire, established between the item of input terminal equipment and the item of output terminal equipment, with a second pseudo-wire serving as a backup pseudo-wire so that, when the item of input terminal equipment forming one end of the first pseudo-wire fails, the data packets are routed by means of the backup pseudo-wire of which one end consists of a different item of input terminal equipment.

Thus, with reference to FIG. 2, a first pseudo-wire pw1 is established between a first item of input terminal equipment T-PE1 placed on the edge of a packet-switched network PSN and an item of output terminal equipment T-PE2 also placed on the edge of the network PSN. A first link L1 forming the pseudo-wire pw1 is established between the item of input terminal equipment T-PE1 and an item of switching equipment S-PE of the network PSN. A second link L2, also forming the pseudo-wire pw1, is established between the item of switching equipment S-PE and the item of output terminal equipment T-PE2. A second pseudo-wire pw2 is then established between a second item of input terminal equipment T-PE3, constituting a first end of the pseudo-wire, and the item of output terminal equipment T-PE2 constituting a second end of the pseudo-wire. A first link L3 forming the second pseudo-wire is established between the second item of input terminal equipment T-PE3 and the item of switching equipment S-PE and a second link L4, also forming the second pseudo-wire, is established between the item of switching equipment S-PE and the item of output terminal equipment T-PE2.

In order to ensure continuity of service, the item of output terminal equipment T-PE2 comprises means for detecting a failure of the links L1 or L2 or of a failure of the first item of input terminal equipment T-PE1 and means for switching the datastream from the first pseudo-wire pw1 to the second pseudo-wire pw2.

When a failure occurs in the first item of input terminal equipment T-PE1, said failure is detected in the item of output terminal equipment T-PE2, for example based on a message indicating the appearance of a failure transmitted over the network PSN to the item of output terminal equipment T-PE2. Once informed of the failure, the item of output terminal equipment T-PE2 requests the switchover of the datastream from the first pseudo-wire pw1 to the second pseudo-wire pw2. The data are then routed from the second item of input terminal equipment T-PE3 to the item of output terminal equipment T-PE2. The result of this is a lengthening of the restoration time in the event of failure of an item of input equipment having a negative impact on the quality of service. Moreover, such a solution has the drawback of consuming network resources such as, for example, processing resources in the items of equipment (storage memory capacity, computing capacity, etc.), the signaling streams for the purpose of establishing the two pseudo-wires, the bandwidth, notably between the item of switching equipment and the item of output terminal equipment.

SUMMARY

The solution proposed in the context of an exemplary embodiment of the invention does not have these drawbacks of the prior art.

Specifically, an embodiment is based on a method for establishing a first pseudo-wire (virtual circuit) between a first item of input terminal equipment and an item of output terminal equipment, run by the first item of input terminal equipment, comprising a step of transmitting a first establishment-request message of the first pseudo-wire to an item of switching equipment, the first pseudo-wire to be established consisting of a first link between the first item of input terminal equipment and the item of switching equipment and of a second link between the item of switching equipment and the item of output terminal equipment.

Such a method comprises, prior to the transmission step, a step of generating the first establishment-request message also comprising a request to establish at least one backup pseudo-wire consisting of the second link and of a third link to be established between the item of switching equipment and a second item of input terminal equipment.

Such a solution makes it possible to optimize the use of the network resources, notably in terms of OPEX because, by establishing two pseudo-wires by means of a single establishment-request message, only the first item of input terminal equipment is configured to establish the first pseudo-wire and the backup pseudo-wire. This results in the transmission of a single establishment-request message of two pseudo-wires, The solution that is the object of an exemplary embodiment of the invention advantageously makes it possible to establish a single link common to both pseudo-wires between the item of switching equipment and the item of output terminal equipment, which makes it possible to optimize the use of the bandwidth between the item of switching equipment and the item of output terminal equipment.

Such a solution has never been envisaged in the prior art. Specifically, in the prior art, when a main pseudo-wire and a backup pseudo-wire are established between a first, respectively a second, item of input terminal equipment and an item of output terminal equipment, each item of input terminal equipment is configured to transmit a message requesting establishment of a pseudo-wire and a link is established between the item of output terminal equipment and the item of switching equipment for each pseudo-wire, namely two links. Moreover, such an approach is recommended in the standards, notably in document "*Pseudowire (PW) Redundancy*" draft-ietf-pwe3-redundancy-00.txt, March 2008.

In order to challenge these prejudices of those skilled in the art, the inventors of the present application propose, on the contrary, pooling the establishment request message of both pseudo-wires and the link established between the item of switching equipment and the item of output terminal equipment which improves the use of the network resources and thus reduces the restoration time in the event of failure of the first item of input terminal equipment. Specifically, in the prior art, the backup pseudo-wire, although not being used to broadcast the data until the main pseudo-wire fails, reserves, by its establishment, resources over the whole of the network between the item of switching equipment and the item of output terminal equipment. By sharing the link established between the item of switching equipment and the item of output terminal equipment with the main pseudo-wire and the backup pseudo-wire, the network resources previously reserved for the backup pseudo-wire are released and can be used in a more optimal manner.

The data broadcast in the pseudo-wires can be payload data, such as for example an ATM stream transporting a service or else service data, such as for example a message of detection of failure of an item of equipment or of a network link. Thus, in the case of service data interchanges, the solution proposed in the present application makes it possible to improve the responsiveness of the items of equipment present in the network.

According to a particular feature of the establishment method that is the subject of an embodiment of the invention, the first establishment-request message also comprises a list of the items of switching equipment between which links constituting the first, second and third links are to be established.

By virtue of this information, the first item of input terminal equipment knows to which items of network equipment it must transmit the first message requesting establishment of the pseudo-wires.

According to another particular feature of the establishment method that is the subject of an embodiment of the invention, the first establishment-request message also comprises an identifier of the item of switching equipment to which the first establishment-request message is to be sent.

In an exemplary embodiment of the invention, in order to initiate the establishment of the main and backup pseudo-wires, it is assumed that the first item of input terminal equipment has, in a routing table, the information on the hops to be made to reach the second item of input terminal equipment and the item of output terminal equipment. By virtue of this information, the first item of input terminal equipment knows to which item of network equipment, which is then considered to be the item of switching equipment, it must send the message requesting establishment of the pseudo-wires. It is then necessary to configure only the first item of input terminal equipment, which lightens the network maintenance operations. The parameter indicating that the second pseudo-wire is a backup pseudo-wire makes it possible to configure the item of switching equipment for the purpose of the subsequent broadcasting of the data.

An embodiment of the invention also relates to a method for establishing a backup pseudo-wire intended to be used in the case of failure of at least one first pseudo-wire established between a first item of input terminal equipment and an item of output terminal equipment, run by an item of switching equipment, comprising a step of receiving a first message requesting establishment of the first pseudo-wire, the first pseudo-wire to be established consisting of a first link between the first item of input terminal equipment and the item of switching equipment and of a second link between the item of switching equipment and the item of output terminal equipment.

In such a protection method, the first establishment-request message also comprising a request to establish the backup pseudo-wire consisting of the second link and of a third link to be established between the item of switching equipment and a second item of input terminal equipment, the method comprises a step of transmitting a second message requesting establishment of the third link to the second item of input terminal equipment.

In such a second establishment-request message, the identifier field of the item of input equipment comprises the identifier of the item of output terminal equipment and the identifier field of the item of output terminal equipment comprises the identifier of the second item of input terminal equipment. Thus, everything happens as if the establishment of the third link were at the initiative of the item of output terminal equipment which is seen as an item of input terminal equipment, the second item of input terminal equipment being seen as an item of output terminal equipment.

According to a particular feature of the protection method that is the subject of an embodiment of the invention, a datastream being broadcast over the first pseudo-wire, the method comprises, on receipt by the item of switching equipment of an item of information concerning failure relating to the first link, a step of switching the datastream to the third link.

Such an embodiment makes it possible to improve the restoration time in the event of a failure relating to the first link since the switchover of the datastream occurs as close as possible to the failure, namely in the item of switching equipment and no longer in the item of output terminal equipment. By moving the step of switching from the item of output terminal equipment to the item of switching equipment, the item of output terminal equipment no longer supports the switchover mechanisms. This makes it possible to make the item of output terminal equipment transparent to the protection mechanisms.

An embodiment of the invention also relates to an item of input terminal equipment comprising means for transmitting a first message requesting establishment of a first pseudo-wire to an item of switching equipment, the first pseudo-wire to be established consisting of a first link between the item of input terminal equipment and the item of switching equipment and of a second link between the item of switching equipment and an item of output terminal equipment.

Such an item of input terminal equipment comprises means for generating the first establishment-request message also comprising a request to establish at least one backup pseudo-wire consisting of the second link and of a third link to be established between the item of switching equipment and a second item of input terminal equipment.

Such an item of input terminal equipment is capable of transmitting a first message requesting establishment of two pseudo-wires having a common link between the item of switching equipment and the item of output terminal equipment then a specific link between the item of switching equipment and a first, respectively a second, item of input terminal equipment. This optimizes the network resources.

An embodiment of the invention also relates to an item of switching equipment intended to be connected via a first link to a first item of input terminal equipment and via a second link to an item of output terminal equipment, said first and second links consisting of a first pseudo-wire to be established, the item of switching equipment comprising means for receiving a first message requesting establishment of the first pseudo-wire.

In such an item of switching equipment, the first establishment-request message also comprising a request to establish a backup pseudo-wire consisting of the second link and of a third link to be established between the item of switching equipment and a second item of input terminal equipment, the item of switching equipment comprises means for transmitting a second message requesting establishment of the third link to the second item of input terminal equipment.

Such an item of switching equipment is capable of establishing, on receipt of a first establishment-request message transmitted by the first item of input terminal equipment, two pseudo-wires having a common link between the item of switching equipment and the item of output terminal equipment then a specific link between the item of switching equipment and a first, respectively a second, item of input terminal equipment. This optimizes the network resources between the item of switching equipment and the item of output terminal equipment which results in improving the restoration time when a failure is detected occurring in the first item of input terminal equipment or on the first link.

According to a particular feature of the item of switching equipment that is the subject of an embodiment of the invention, the latter comprises means for switching a datastream from the first link to the third link in the event of failure relating to the first link.

Installing a datastream switching function in the item of switching equipment improves the restoration time when a failure is detected occurring in the first item of input terminal equipment.

The consequence of this is an improvement in the network responsiveness because the switchover occurs as close as possible to the failure. Thus, the failure of the first item of input terminal equipment is dealt with more rapidly, the information not having to cross the network to the item of output terminal equipment before being handled. Thus, the switchover of the datastream to the third link, established between the item of switching equipment and the second item of input terminal equipment and constituted with the second link of the backup pseudo-wire, occurs more rapidly.

Such a solution reduces the quantity of data lost following the failure of the first item of input terminal equipment.

An embodiment of the invention also relates to a first computer program comprising program-code instructions for the application of the steps of the first method that is the subject of an embodiment of the invention, when the program is run by a processor.

An embodiment of the invention relates to a second computer program comprising program-code instructions for the application of the steps of the second method that is the subject of an embodiment of the invention, when the program is run by a processor.

Finally an embodiment of the invention relates to a signal comprising a establishment request message of a first pseudo-wire between a first item of input terminal equipment and an item of output terminal equipment, intended to be transmitted between the item of input terminal equipment and an item of switching equipment, the first pseudo-wire to be established consisting of a first link between the first item of input terminal equipment and the item of switching equipment and of a second link between the item of switching equipment and the item of output terminal equipment.

In such a signal, the establishment-request message also comprises a request to establish at least one backup pseudo-wire consisting of the second link and of a third link to be established between the item of switching equipment and a second item of input terminal equipment.

BRIEF DESCRIPTION OF THE DRAWINGS

Other features and advantages will appear on reading embodiments described with reference to the drawings in which.

DETAILED DESCRIPTION OF ILLUSTRATIVE EMBODIMENTS

Figure 1:
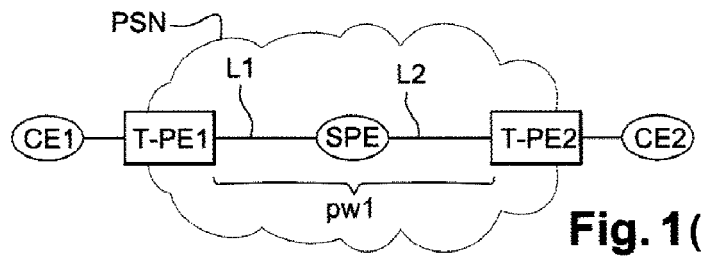
FIG. 1 represents a pseudo-wire established according to the prior art between an item of input terminal equipment and an item of output terminal equipment belonging to a packet-switched network.
Figure 2:
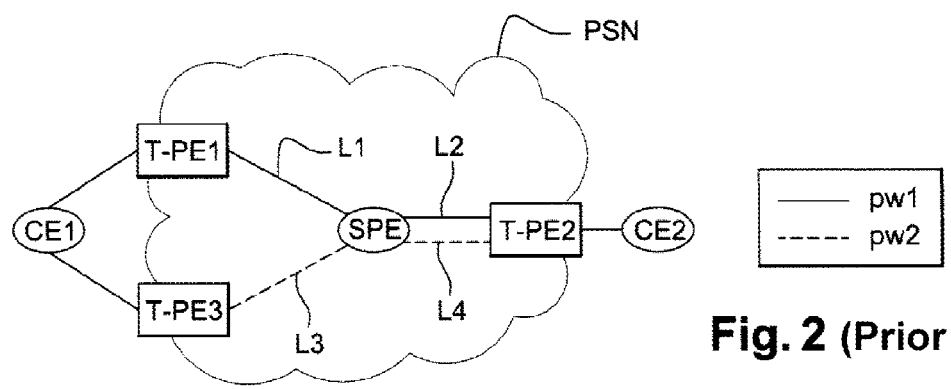
FIG. 2 represents the solution used in the prior art to ensure the continuity of service in a packet-switched network.
Figure 3:
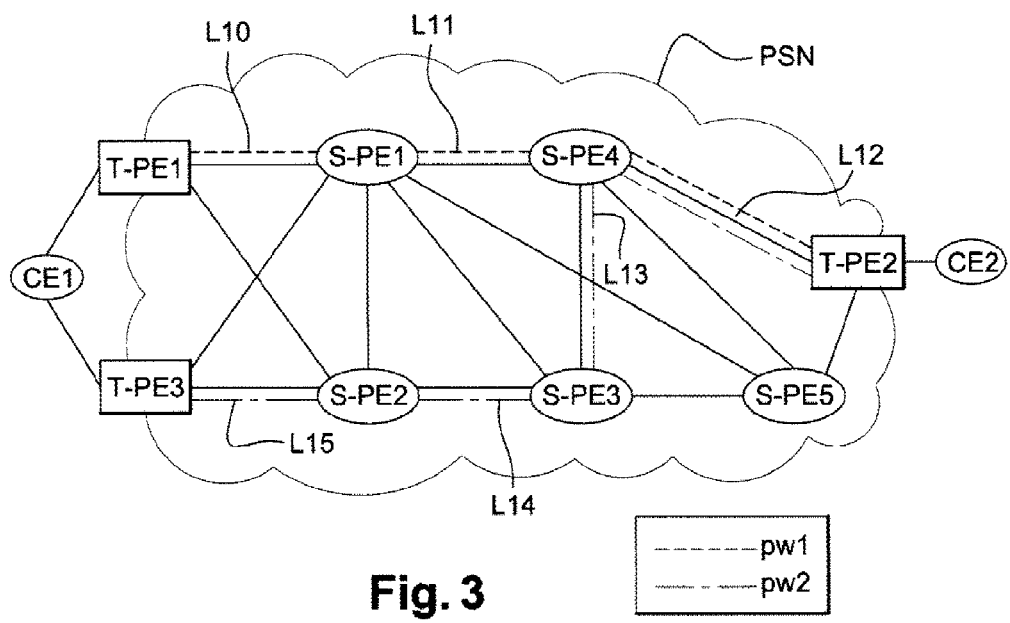
FIG. 3 illustrates two pseudo-links established according to the establishment method that is the subject of an embodiment of the invention, FIG. 4 proposes a timing diagram of interchanges of messages between a first item of input terminal equipment and items of switching equipment belonging to a packet-switched network on the one hand and the items of switching equipment and an item of output terminal equipment and a second item of input terminal equipment on the other hand, in order to establish pseudo-wires according to the establishment method that is the subject of an embodiment of the invention.

FIG. 3 represents a packet-switched network PSN comprising a plurality of items of terminal equipment T-PE1, T-PE2 and T-PE3 and a plurality of items of switching equipment S-PE1 to S-PE5. In such a network, a link is established between a first item of input terminal equipment T-PE1, an item of output terminal equipment T-PE2 and a second item of input terminal equipment T-PE3, each of these three items of terminal equipment being placed on the edge of the packet-switched network PSN.

With reference to this figure, a first link L10 is established between the first item of input terminal equipment T-PE1 and a first item of switching equipment S-PE1 belonging to the network PSN. A second link L11 is established between the first item of switching equipment S-PE1 and a second item of switching equipment S-PE4. A third link L12 is established between the second item of switching equipment S-PE4 and the item of output terminal equipment T-PE2. The first link L10, the second link L11 and the third link L12 constitute a first pseudo-wire (virtual circuit) pw1, called the main pseudo-wire, establishing a link between the first item of input terminal equipment T-PE1 and the item of output terminal equipment T-PE2. The pseudo-wire pw1 thus established makes it possible to broadcast, in a two-way manner, datastreams divided into packets between the item of input equipment T-PE1 and the item of output equipment T-PE2.

A second pseudo-wire pw2, called the backup pseudo-wire, is established between the second item of input terminal equipment T-PE3 and the item of output terminal equipment T-PE2. The pseudo-wire pw2 consists of a first link L15 established between the item of input terminal equipment T-PE3 and an item of switching equipment S-PE2, of a second link L14 established between the item of switching equipment S-PE2 and an item of switching equipment S-PE3, of a third link L13 established between the item of switching equipment S-PE3 and an item of switching equipment S-PE4 and the link L12.

Thus, the link L12 is common to both pseudo-wires pw1 and pw2. Such a solution optimizes the network resources such as the bandwidth between the item of switching equipment S-PE4 and the item of output terminal equipment T-PE2.

An exemplary application of an embodiment of the invention is the collection of traffic for a mobile network. In such an example, the items of input terminal equipment T-PE1 and T-PE3 are connected to a first item of equipment such as a base station CE1, the item of terminal equipment T-PE1 transmitting the data originating from the base station CE1 to other items of aggregation equipment such as an RNC (Radio Network Controller) CE2, connected to the item of output terminal equipment T-PE2.

Figure 4:
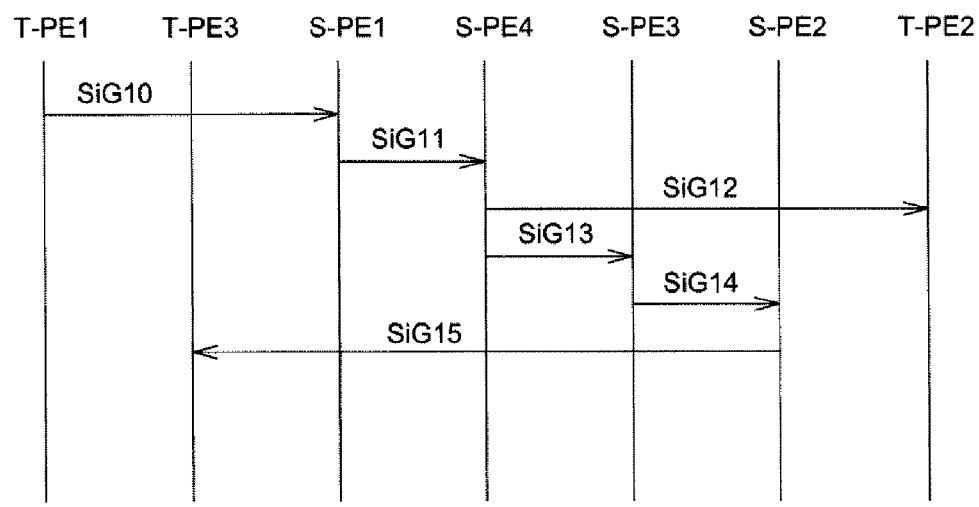

FIG. 4 represents a timing diagram of interchange of messages between the first item of input terminal equipment T-PE1, the items of switching equipment S-PE1, S-PE4, S-PE3 and S-PE2, the item of output terminal equipment T-PE2 and the second item of input terminal equipment T-PE3 during the establishment of the pseudo-wires pw1 and pw2.

According to an embodiment of the invention, the establishment of the pseudo-wires pw1 and pw2 is at the initiative of the first item of input terminal equipment T-PE1 and is based on the interchange of establishment messages according to the LDP (Label Distribution Protocol) protocol as defined in documents RFC3036 and RFC4477.

Figure 5A:
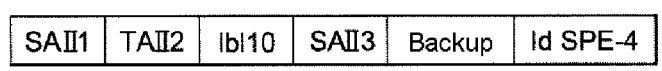
FIGS. 5A, 5B, 5C represent establishment messages used in the establishment method that is the subject of an embodiment of the invention, FIG. 6 proposes a timing diagram of interchanges of messages between a first item of input terminal equipment and items of switching equipment belonging to a packet-switched network on the one hand, and the items of switching equipment and an item of output terminal equipment and a second item of input terminal equipment on the other hand, when data are broadcast in the pseudo-wires established in the packet-switched network, according to the establishment method that is the subject of the invention, in a first embodiment of the invention, FIG. 7 proposes a timing diagram of interchanges of messages between a first item of input terminal equipment and items of switching equipment belonging to a packet-switched network on the one hand, and the items of switching equipment and an item of output terminal equipment and a second item of input terminal equipment on the other hand, when data are broadcast in the pseudo-wires established in the packet-switched network, according to the establishment method that is the subject of the invention, in a second embodiment of the invention.

A first establishment-request message SIG10 is generated by the item of input terminal equipment T-PE1 and comprises an identifier SAII1 of the first item of input terminal equipment T-PE1, an identifier TAII2 of the item of output terminal equipment T-PE2, and an identifier SAII3 of the second item of input terminal equipment T-PE3, a "backup" parameter specifying that the second pseudo-wire pw2 is a backup pseudo-wire and an identifier of an item of switching equipment S-PE4 carrying out the switchover from the first pseudo-wire pw1 to the second pseudo-wire pw2 in the event of failure of the links L10 or L11 constituting the pseudo-wire pw1. Such an establishment-request message SIG10 is shown in FIG. 5A.

Such a first establishment-request message SIG10 differs from a conventional message for establishing a pseudo-wire because it comprises additional data such as the identifier SAII3 of the second item of input terminal equipment T-PE3 and the "backup" parameter indicating the nature of the second pseudo-wire pw2 to be established, the identifier of the item of switching equipment S-PE4.

The establishment-request message SIG10 may comprise several identifiers of items of input terminal equipment to be reached in the event of failure of a link constituting the first pseudo-wire pw1. Such a message comprises as many "backup" parameters as there are items of input terminal equipment to be reached and hence as there are backup pseudo-wires to be established.

The establishment-request message SIG10 may also comprise an additional field comprising a list of the items of switching equipment between which the links constituting the first pseudo-wire pw1 must be established and a list of the items of switching equipment between which the links constituting the second pseudo-wire pw2 must be established.

When the message SIG10 does not comprise such lists, the identification of the items of switching equipment between which the links constituting the first pseudo-wire pw1 and the links constituting the second pseudo-wire pw2 must be established are determined by means of a routing table of the item of switching equipment S-PE1 receiving the message SIG10.

The pair {identifier SAII1 of the first item of input terminal equipment T-PE1; identifier TAII2 of the first item of output equipment T-PE2} constitutes an FEC (Forwarding Equivalent Class). This information is necessary for the establishment of a pseudo-wire. The pair consisting of the identifier SAII2 of the item of output terminal equipment T-PE2 and of the identifier TAII3 of the second item of input terminal equipment T-PE3 also constitutes an FEC.

When the first pseudo-wire is established through a single item of switching equipment, the establishment-request message SIG10 comprises no list of items of switching equipment between which the links constituting the first pseudo-wire pw1 and the second pseudo-wire pw2 must be established, and no identifier of the item of switching equipment.

The establishment-request message SIG10 also comprises a label lbl10. This label is used by the first item of input terminal equipment T-PE1 and the first item of switching equipment S-PE1 when the datastreams are broadcast from the item of switching equipment S-PE1 to the first item of input terminal equipment T-PE1 This label is added by the first item of switching equipment S-PE1 to each data packet intended to be transmitted to the first item of input terminal equipment T-PE1.

The establishment-request message SIG10 thus generated is then transmitted by the first item of input terminal equipment T-PE1 to the first item of switching equipment S-PE1.

On receipt of the first establishment-request message SIG10, the item of switching equipment S-PE1 extracts the identifier of the first item of input terminal equipment T-PE1, the identifier of the item of output terminal equipment T-PE2 and, as appropriate, the list of items of switching equipment between which the links constituting the first pseudo-wire pw1 and the list of items of switching equipment between which the links constituting the second pseudo-wire pw2 must be established.

Provided with this information, the first item of switching equipment S-PE1 completes a switching table. This switching table comprises, for a given FEC, an item of information indicating the label that has to be inserted into the message header in order to reach the item of equipment transmitting the message, in this example the first item of input terminal equipment, whether the latter be another item of switching equipment or the item of output terminal equipment.

Once the switching table has been completed, the first item of switching equipment S-PE1 transmits a second establishment-request message SIG11. The establishment-request message SIG11 is transmitted to the second item of switching equipment S-PE4.

The hop that the establishment-request message SIG11 must make to reach the second item of switching equipment S-PE4 is determined by means of the routing information contained in a routing table of the item of switching equipment S-PE1.

The message SIG11 is identical to the message SIG10, only the label lbl11 to be used when the data are broadcast indicates the difference between the two messages.

The information relating to the backup pseudo-wire pw2, such as the identifier of the item of switching equipment that has to carry out the switchover from the first pseudo-wire pw1 to the backup pseudo-wire pw2, is transmitted from one item of switching equipment to another until the item of switching equipment that has to carry out the switchover is reached.

On receipt of this establishment-request message SIG11, the item of switching equipment S-PE4 extracts the identifier of the first item of input terminal equipment T-PE1, the identifier of the item of output terminal equipment T-PE2 and, as appropriate, the list of items of switching equipment between which the links constituting the first pseudo-wire pw1 and the list of items of switching equipment between which the links constituting the second pseudo-wire pw2 must be established and an explicit list of the items of switching equipment between which the links constituting the backup pseudo-wire pw2 must be established. The item of switching equipment S-PE4 being the item of switching equipment that must carry out the switchover, its switching table is also completed with the "backup" parameter indicating the nature of the second pseudo-wire pw2.

Once the switching table of the item of switching equipment S-PE4 is completed, the latter transmits two establishment messages SIG12 and SIG13 to respectively the item of output terminal equipment T-PE2 and the item of switching equipment S-PE3.

Figure 5B:

The message SIG12 comprises the identifier SAII1 of the first item of input terminal equipment T-PE1, the identifier TAII2 of the item of output terminal equipment T-PE2, the identifier of the item of switching equipment that must carry out the switchover from the first pseudo-wire pw1 to the backup pseudo-wire pw2, and the label lbl12 to be associated with the link L12 and used during the broadcasting of the data. Such a message is represented in FIG. 5B.

The message SIG13, for its part, comprises the identifier SAII2 of the item of output terminal equipment T-PE2, the identifier TAII3 of the second item of input terminal equipment T-PE3, the identifier of the item of switching equipment that must carry out the switchover from the first pseudo-wire pw1 to the backup pseudo-wire pw2, and the label lbl13 associated with the link L13 to be established and used during the broadcasting of the data. Such a message may comprise an explicit list of the items of switching equipment between which the links constituting the second pseudo-wire pw2 must be established in order to connect the item of switching equipment S-PE4 to the second item of input terminal equipment T-PE3. In such an establishment-request message, the field identifying the item of input equipment comprises the identifier of the item of output terminal equipment T-PE2 and the field identifying the item of output terminal equipment comprises the identifier of the second item of input terminal equipment T-PE3. Thus, everything happens as if the establishment of the link L13 constituting the second pseudo-wire pw2 were at the initiative of the item of output terminal equipment T-PE2 which is seen as an item of input terminal equipment, the second item of input terminal equipment T-PE3 being seen as an item of output terminal equipment.

Once the switching table of the item of switching equipment S-PE3 is completed, the item of switching equipment S-PE3 transmits an establishment-request message SIG14 to the item of switching equipment S-PE2.

The message SIG14 is identical to the message SIG13, only the label lbl14 to be used during the broadcasting of the data indicates the difference between the two messages.

On receipt of the establishment-request message SIG14, the item of switching equipment S-PE2 transmits an establishment-request message SIG15 to the second item of input termination equipment T-PE3.

Figure 5C:
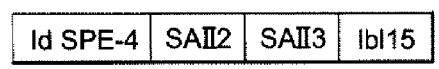

The message SIG15 is identical to the message SIG14, only the label lbl15 to be used during the broadcasting of the data indicates the difference between the two messages. Such a message is represented in FIG. 5C.

On receipt of a data packet transmitted by the first item of input terminal equipment T-PE1, the first item of switching equipment S-PE1 uses the label added to the packet by the first item of terminal equipment T-PE1 in order to determine, depending on the information contained in the switching table, to which item of switching equipment the data packet is directed. Before the transmission of the data packet to the item of switching equipment S-PE4, a new label is added to the data packet.

On receipt of the establishment message SIG12, the item of output terminal equipment T-PE2 transmits, to the first item of input terminal equipment T-PE1, a message to establish a pseudo-wire so as to be able to transmit datastreams in both ways between these two items of terminal equipment. Thus, although T-PE2 is an item of output terminal equipment, it may also behave like an item of input terminal equipment.

The same applies to the second item of input terminal equipment T-PE3 which, on receipt of the message SIG15, transmits to the item of output terminal equipment T-PE2 a message to establish a pseudo-wire in order to be able to transmit datastreams in both ways between these two items of terminal equipment.

Figure 6:
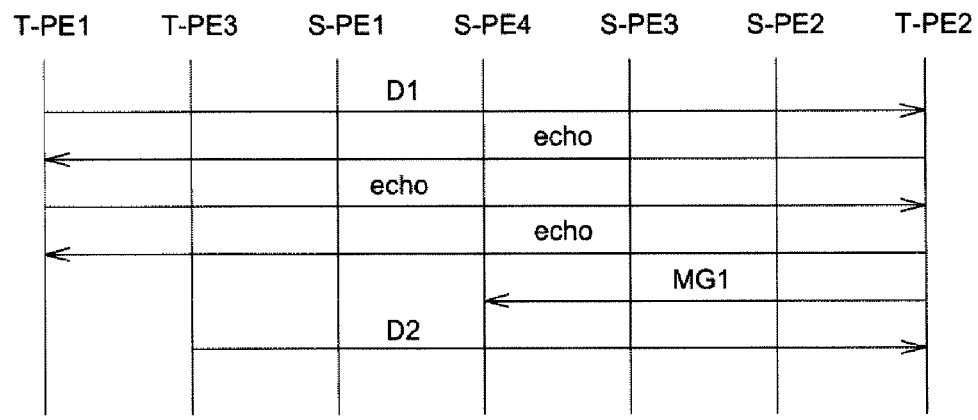

FIG. 6 represents a timing diagram of interchange of messages between the first item of input terminal equipment T-PE1, the items of switching equipment S-PE1, S-PE4, S-PE3 and S-PE2, the item of output terminal equipment T-PE2 and the second item of input terminal equipment T-PE3 during the broadcasting of datastreams.

A datastream D1 is transmitted by the first item of input terminal equipment T-PE1 to the item of output terminal equipment T-PE2. This datastream is broadcast over the network PSN by means of the first pseudo-wire pw1.

In order to ensure continuity of service, the item of output terminal equipment T-PE2 takes on a function for detecting a failure of the first item of input equipment T-PE1 or of the first link, consisting of the links L10 and L11, constituting the first pseudo-wire pw1. In order to detect such a failure, the item of output terminal equipment T-PE2 regularly interchanges "echo" messages with the first item of input terminal equipment T-PE1.

When the item of output terminal equipment receives no response to an "echo" message, it deduces therefrom that the first item of input terminal equipment T-PE1, one of the links L10 or L11 or the item of switching equipment S-PE1 is faulty.

When a failure is detected, the item of output terminal equipment T-PE2 then transmits a switchover message MG1 to the item of switching equipment S-PE4. The item of output terminal equipment T-PE2 identifies the item of switching equipment S-PE4 as the item of equipment that is to receive the message MG1 by means of the identifier of the item of switching equipment S-PE4 included in the establishment message SIG12.

On receipt of this message, the item of switching equipment S-PE4 switches over the datastreams to the links L13, L14 and L15.

In parallel, the item of output terminal equipment T-PE2 asks the item of equipment CE1 to switch over the datastream from the item of input terminal equipment T-PE1 to the item of input terminal equipment T-PE3.

In a variant embodiment, the failure is detected by an item of switching equipment which then propagates step by step a switchover message. Once this switch over message is received by the item of switching equipment S-PE4, the latter switches over the datastreams to the second pseudo-wire.

In parallel, the item of output switching equipment S-PE4 notifies the output terminal T-PE2 of the failure and asks the item of equipment CE1 to switch over the datastream from the item of input terminal equipment T-PE1 to the item of input terminal equipment T-PE3.

A datastream D2 is then transmitted by the second item of input terminal equipment T-PE3 following the detection of the failure of the first item of input terminal equipment T-PE1 and broadcast via the second pseudo-wire pw2.

Figure 7:
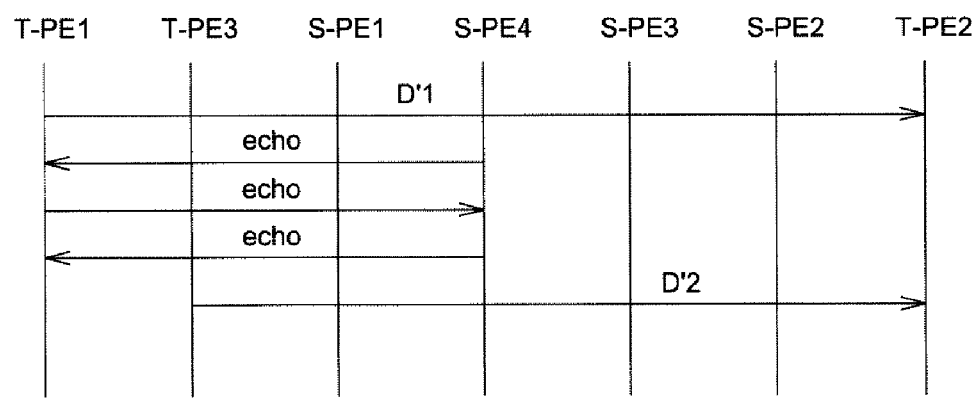

In another embodiment described with reference to FIG. 7, the item of switching equipment S-PE4 takes on a function of detecting a failure of the first item of input terminal equipment T-PE1 or of the first link, consisting of the links L10 and L11, constituting the first pseudo-wire pw1. In order to detect such a failure, the item of switching equipment S-PE4 interchanges for example regularly "echo" messages with the first item of input terminal equipment T-PE1.

When the item of switching equipment S-PE4 receives no response to its "echo" message, it deduces therefrom that the first item of input terminal equipment T-PE1 is faulty. It then switches over the datastreams originating from the first item of input terminal equipment T-PE1 to the links L13, L14, L15 and informs the item of output terminal equipment T-PE2 and the item of equipment CE1 thereof.

Thus, a datastream D'1 transmitted by the first item of input terminal equipment T-PE1 following the detection of the failure of the latter or of the first link is then transmitted via the second item of input terminal equipment T-PE3 and broadcast via the second pseudo-wire pw2.

Figure 8:
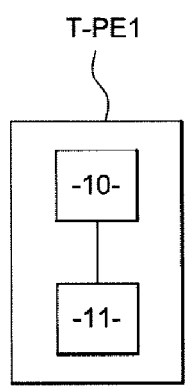
FIG. 8 represents an item of input terminal equipment capable of applying the establishment method that is the subject of an embodiment of the invention.

FIG. 8 represents an item of input terminal equipment T-PE1 capable of applying the establishment method that is the subject of an embodiment of the invention.

The item of input terminal equipment T-PE1 comprises means 10 (i.e., a transmitter) for transmitting a message requesting establishment of two pseudo-wires.

The item of input terminal equipment T-PE1 comprises, connected at the input, transmission means 10, means 11 (i.e., a message generator) for generating the message for establishing two pseudo-wires. Such generation means 11 differ from the conventional means for generating a message to establish a pseudo-wire in that they are capable of generating establishment-request messages comprising additional data such as an identifier of a second item of input terminal equipment constituting one end of the two pseudo-wires to be established and a "backup" parameter indicating the nature of the second pseudo-wire to be established, the identifier of an item of switching equipment through which the two pseudo-wires are established.

Thus, the generation means 11 comprise means for processing additional information in order to generate the establishment-request message such as information relating to the topology of the packet-switched network to which the items of termination equipment and the item of switching equipment belong and notably the various hops to be made to reach the items of equipment concerned.

Figure 9:
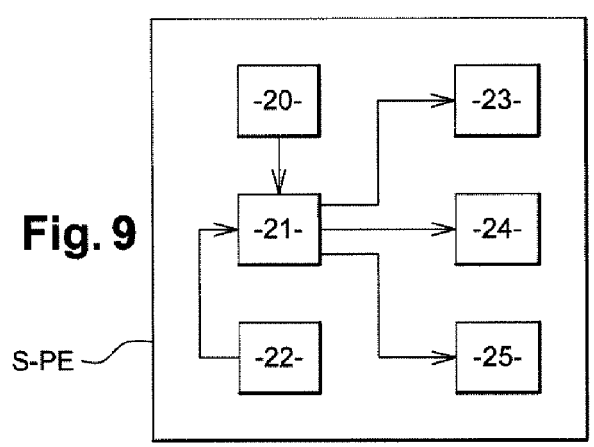
FIG. 9 represents an item of switching equipment capable of applying the protection method that is the subject of an embodiment of the invention.

FIG. 9 represents an item of switching equipment S-PE capable of applying the protection method that is the subject of an embodiment of the invention.

This item of equipment S-PE comprises an integrated pre-programmed board comprising a memory 20 forming a means for storing a computer program making it possible to apply the methods for establishing two pseudo-wires and for protecting datastreams over the pseudo-wires thus established, that are the subject of an embodiment of the invention, and means 21 making it possible to command the running of the computer program, these means notably comprising a processor.

The item of switching equipment S-PE also comprises means 22 (i.e., a receiver) for receiving a message requesting establishment of two pseudo-wires, and means 23 for transmitting messages for establishing backup pseudo-wires.

The item of switching equipment also comprises means 24 (i.e., a switch) for switching over a datastream transmitted via the first pseudo-wire to a backup pseudo-wire in the event of failure of the links constituting the first pseudo-wire.

Finally, in a particular embodiment of the item of switching equipment S-PE, the latter also comprises means 25 (i.e., a detector) for detecting a failure of links constituting the first pseudo-wire.

Finally, a further subject of an embodiment of the invention is a computer program, notably a computer program on or in an information or memory medium, suitable for applying an embodiment of the invention. This program may use any programming language and be in the form of source code, object code or intermediate code between source code and object code such as in a partially compiled form, or in any other form that is desired to implement a method according to an embodiment of the invention.

The information medium may be any entity or device capable of storing the program. For example, the medium may comprise a storage means such as a ROM, for example a CD ROM or a microelectronic-circuit ROM, or else a magnetic recording means, for example a floppy disk or a hard disk.

Moreover, the information medium may be a transmittable medium such as an electrical or optical signal that can be conveyed via an electric or optic cable, by radio or by other means. The program according to an embodiment of the invention may in particular be downloaded over a network of the Internet type.

Although the present disclosure has been described with reference to one or more examples, workers skilled in the art will recognize that changes may be made in form and detail without departing from the scope of the disclosure and/or the appended claims.

The invention claimed is:

1. A method for establishing a backup pseudo-wire intended to be used in the case of failure of at least one first pseudo-wire established between a first item of input terminal equipment and an item of output terminal equipment, run by an item of switching equipment, comprising:
  a step of receiving a first establishment request message of the first pseudo-wire, the first pseudo-wire to be established comprising a first link between the first item of input terminal equipment and the item of switching equipment and a second link between the item of switching equipment and the item of output terminal equipment, wherein the first establishment-request message comprises:
    an identifier of said item of switching equipment, and
    a request to establish the backup pseudo-wire comprising the second link and of
      a third link to be established between the item of switching equipment and
      a second item of input terminal equipment, and on receipt of said first message,
  a step of establishing the backup pseudo-wire comprising a step of transmitting a second message requesting establishment of the third link to the second item of input terminal equipment, and
  a step of establishing the first pseudo-wire comprising a step of transmitting a third message requesting establishment of the second link to the item of output terminal equipment.

2. The method as claimed in claim 1, in which, for a datastream being broadcast over the first pseudo-wire, the method comprises, on receipt by the item of switching equipment of an item of information concerning failure relating to the first link, a step of switching the datastream to the third link.

3. An item of switching equipment intended to be connected via a first link to a first item of input terminal equipment and via a second link to an item of output terminal equipment, said first and second links comprising a first pseudo-wire to be established, the item of switching equipment comprising:
  means for receiving a first establishment request message of the first pseudo-wire, wherein the first establishment-request message comprises a request to establish a backup pseudo-wire comprising the second link and a third link to be established between the item of switching equipment and a second item of input terminal equipment, and
  means for establishing the backup pseudo-wire, on receipt of said first establishment request message, comprising transmitting a second message requesting establishment of the third link to the second item of input terminal equipment, and
  means for establishing the first pseudo-wire, on receipt of said first establishment request message, comprising transmitting a third message requesting establishment of the second link to the item of output terminal equipment.

4. The item of switching equipment as claimed in claim 3, comprising means for switching a datastream from the first link to the third link in the event of failure relating to the first link.

5. A non-transient computer-readable medium comprising a computer program recorded thereon, wherein the program comprises program-code instructions for performing a method for establishing a backup pseudo-wire intended to be used in the case of failure of at least one first pseudo-wire established between a first item of input terminal equipment and an item of output terminal equipment, run by an item of switching equipment, when the program is run by a processor, wherein the method comprises:
  a step of receiving a first establishment request message of the first pseudo-wire, the first pseudo-wire to be established comprising a first link between the first item of input terminal equipment and the item of switching equipment and a second link between the item of switching equipment and the item of output terminal equipment, wherein the first establishment-request message comprises:
    an identifier of said item of switching equipment, and
    a request to establish the backup pseudo-wire comprising the second link and of
      a third link to be established between the item of switching equipment and
      a second item of input terminal equipment, and on receipt of said first message,
  a step of establishing the backup pseudo-wire comprising a step of transmitting a second message requesting establishment of the third link to the second item of input terminal equipment, and a step of establishing the first pseudo-wire comprising a step of transmitting a third message requesting establishment of the second link to the item of output terminal equipment.

\* \* \* \* \*

UNITED STATES PATENT AND TRADEMARK OFFICE
CERTIFICATE OF CORRECTION

PATENT NO.         : 8,724,451 B2                                        Page 1 of 1
APPLICATION NO. : 13/001508
DATED              : May 13, 2014
INVENTOR(S)        : Niger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 280 days.

Signed and Sealed this

Twenty-ninth Day of September, 2015

Michelle K. Lee
*Director of the United States Patent and Trademark Office*